(12) United States Patent
Duan et al.

(10) Patent No.: US 12,469,112 B2
(45) Date of Patent: Nov. 11, 2025

(54) IMAGE RESTORATION METHOD AND APPARATUS, AND ELECTRONIC DEVICE

(71) Applicant: BOE Technology Group Co., Ltd., Beijing (CN)

(72) Inventors: Ran Duan, Beijing (CN); Dan Zhu, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 426 days.

(21) Appl. No.: 17/922,150

(22) PCT Filed: May 25, 2021

(86) PCT No.: PCT/CN2021/095778
§ 371 (c)(1),
(2) Date: Oct. 28, 2022

(87) PCT Pub. No.: WO2021/258959
PCT Pub. Date: Dec. 30, 2021

(65) Prior Publication Data
US 2023/0177652 A1    Jun. 8, 2023

(30) Foreign Application Priority Data
Jun. 22, 2020  (CN) .......................... 202010574404.7

(51) Int. Cl.
*G06T 5/70*       (2024.01)
*G06T 3/4046*    (2024.01)
(Continued)

(52) U.S. Cl.
CPC .............. *G06T 5/70* (2024.01); *G06T 3/4046* (2013.01); *H04N 19/42* (2014.11); *H04N 19/86* (2014.11);
(Continued)

(58) Field of Classification Search
CPC ........... G06T 5/70; G06T 5/60; G06T 3/4046; G06T 3/4038; G06T 2207/10016;
(Continued)

(56) References Cited

U.S. PATENT DOCUMENTS

2018/0025474 A1    1/2018  Mei et al.
2019/0281310 A1*  9/2019  Lee ...................... H04N 19/176
(Continued)

FOREIGN PATENT DOCUMENTS

CN    106331433 A    1/2017
CN    107645621 A    1/2018
(Continued)

OTHER PUBLICATIONS

S. Nah et al., "AIM 2019 Challenge on Video Temporal Super-Resolution: Methods and Results," 2019 IEEE/CVF International Conference on Computer Vision Workshop (ICCVW), Seoul, Korea (South), 2019, pp. 3388-3398, doi: 10.1109/ICCVW.2019.00421. Used for backward citation search (Year: 2019).*
(Continued)

*Primary Examiner* — Chan S Park
*Assistant Examiner* — Paulo Andres Garcia
(74) *Attorney, Agent, or Firm* — IPro, PLLC

(57) ABSTRACT

An image restoration method and apparatus, and an electronic device. The method includes: inputting, into a target denoising network, an image to be processed, where the target denoising network includes a single-frame network and a recursive network, and the image to be processed is any frame in a video to be processed (S101); removing, via the single-frame network, compression noise of the image to be processed, and outputting a first image (S102); according to the content of the previous frame of image, removing, via the recursive network, compression noise of the image to be processed, and outputting a second image, where the previ-
(Continued)

ous frame of image is the previous frame of image of the image to be processed in the video to be processed (S103); and performing weighted summation on the first image and the second image, and outputting a denoised image for the image to be processed (S104).

12 Claims, 10 Drawing Sheets

(51) Int. Cl.
    *H04N 19/42*     (2014.01)
    *H04N 19/86*     (2014.01)

(52) U.S. Cl.
    CPC ............... *G06T 2207/10016* (2013.01); *G06T 2207/20081* (2013.01); *G06T 2207/20084* (2013.01)

(58) Field of Classification Search
    CPC ........... G06T 2207/20081; G06T 2207/20084; H04N 19/42; H04N 19/86; H04N 19/30; H04N 19/423; Y02T 10/40; G06N 3/045; G06N 3/08
    See application file for complete search history.

(56) References Cited

U.S. PATENT DOCUMENTS

| | | | |
|---|---|---|---|
| 2019/0304068 A1 | 10/2019 | Vogels et al. | |
| 2020/0226718 A1* | 7/2020 | Reddy | G06T 3/4046 |
| 2020/0304802 A1* | 9/2020 | Habibian | H04N 19/124 |
| 2020/0311892 A1* | 10/2020 | Pasula | G06V 10/141 |
| 2021/0374907 A1* | 12/2021 | Su | G06T 5/70 |
| 2022/0188982 A1* | 6/2022 | Sun | G06T 5/60 |

FOREIGN PATENT DOCUMENTS

| | | |
|---|---|---|
| CN | 110852961 A | 2/2020 |
| CN | 111738952 A | 10/2020 |

OTHER PUBLICATIONS

G. Lu, X. Zhang, W. Ouyang, D. Xu, L. Chen and Z. Gao, "Deep Non-Local Kalman Network for Video Compression Artifact Reduction," in IEEE Transactions on Image Processing, vol. 29, pp. 1725-1737, 2020, doi: 10.1109/TIP.2019.2943214 (Year: 2019).*

X. Wang et al. "EDVR: Video Restoration with Enhanced Deformable Convolutional Networks", https://arxiv.org/abs/1905.02716, https://doi.org/10.48550/arXiv.1905.02716 (Year: 2019).*

G. Cheng, A. Matsune, Q. Li, L. Zhu, H. Zang and S. Zhan, "Encoder-Decoder Residual Network for Real Super-Resolution," 2019 IEEE/CVF Conference on Computer Vision and Pattern Recognition Workshops (CVPRW), Long Beach, CA, USA, 2019, pp. 2169-2178, doi: 10.1109/CVPRW.2019.00270. (Year: 2019).* https://mlexplained.blog/2023/07/31/huber-loss-loss-function-to-use-in-regression-when-dealing-with-outliers/, contains explanation of how Huber loss works, benefits downsides, etc. (Year: 2023).*

Cai et al., "NTIRE 2019 Challenge on Real Image Super-Resolution: Methods and Results," 2019 IEEE/CVF Conference on Computer Vision and Pattern Recognition Workshops (CVPRW), Long Beach, CA, USA, 2019, pp. 2211-2223, doi: 10.1109/CVPRW.2019.00274. Backward citation search. (Year: 2019).*

C. O. Ancuti et al., "NTIRE 2019 Image Dehazing Challenge Report," 2019 IEEE/CVF Conference on Computer Vision and Pattern Recognition Workshops (CVPRW), Long Beach, CA, USA, 2019, pp. 2241-2253, doi: 10.1109/CVPRW.2019.00277. Backward citation search. (Year: 2019).*

Y. Jo, S. W. Oh, J. Kang and S. J. Kim, "Deep Video Super-Resolution Network Using Dynamic Upsampling Filters Without Explicit Motion Compensation," 2018 IEEE/CVF Conference on Computer Vision and Pattern Recognition, Salt Lake City, UT, USA, 2018, pp. 3224-3232, doi: 10.1109/CVPR.2018.00340. (Year: 2018).*

F. Jiang, W. Tao, S. Liu, J. Ren, X. Guo and D. Zhao, "An End-to-End Compression Framework Based on Convolutional Neural Networks," in IEEE Transactions on Circuits and Systems for Video Technology, vol. 28, No. 10, pp. 3007-3018, Oct. 2018, doi: 10.1109/TCSVT.2017.2734838 (Year: 2018).*

Huang, Yan and Wang, Wei and Wang, Liang, Bidirectional Recurrent Convolutional Networks for Multi-Frame Super-Resolution, Curran Associates, Inc., Advances in Neural Information Processing Systems, vol. 28, 2015 (Year: 2015).*

PCT/CN2021/095778 international search report.

* cited by examiner

IMAGE RESTORATION METHOD AND APPARATUS, AND ELECTRONIC DEVICE

CROSS REFERENCE TO RELATED APPLICATIONS

The present disclosure is a US National Stage of International Application No. PCT/CN2021/095778, filed on May 25, 2021, which claims priority to the Chinese Patent Application No. 202010574404.7, entitled "IMAGE RESTORATION METHOD AND APPARATUS, AND ELECTRONIC DEVICE", filed to the China Patent Office on Jun. 22, 2020, the entire contents of which are incorporated herein by reference.

FIELD

The present disclosure relates to the technical field of image processing, in particular to an image restoration method and apparatus, and an electronic device.

BACKGROUND

In order to avoid occupying of a larger storage space by a video and increase a transmission speed, it is often necessary to compress the video. However, various noises are inevitably generated in a compression process, which will affect a display effect.

SUMMARY

In a first aspect, an embodiment of the present disclosure provides an image restoration method, including:
  inputting an image to be processed into a target denoising network, where the target denoising network includes a single-frame network and a recursive network, and the image to be processed is any frame in a video to be processed;
  removing, via the single-frame network, compression noise of the image to be processed to output a first image;
  removing, according to a content of a previous frame image, compression noise of the image to be processed via the recursive network to output a second image, where the previous frame image is one previous frame of the image to be processed in the video to be processed; and
  performing weighted summation on the first image and the second image, and outputting a denoised image for the image to be processed.

In a possible implementation, the removing, according to the content of the previous frame image, the compression noise of the image to be processed via the recursive network to output the second image, includes:
  removing the compression noise of the image to be processed via at least one first convolution layer, at least one first feature series layer and at least one first sampling layer cascaded in the recursive network, to output the second image.

In a possible implementation, the at least one first convolution layer in the recursive network includes a first sub-convolution layer and a second sub-convolution layer, the at least one first feature series layer includes a first sub-feature series layer and a second sub-feature series layer, and the at least one first sampling layer includes first down-sampling layers and first up-sampling layers;
  where the removing the compression noise of the image to be processed via the at least one first convolution layer, the at least one first feature series layer and the at least one first sampling layer cascaded in the recursive network, to output the second image includes:
  receiving, via the first sub-feature series layer, a first feature image of the image to be processed extracted by each of third sub-convolution layers in second convolution layers in the single-frame network, and obtaining, via the first sub-feature series layer, a second feature image extracted from the previous frame image by the first sub-convolution layer corresponding to each third sub-convolution layer in the recursive network;
  obtaining a series feature image by performing, via the first sub-feature series layer, series operation on the first feature image and the second feature image;
  obtaining a compressed feature image by performing, via each of first sub-convolution layers, compression on the series feature image, where the compressed feature images are second feature images extracted from the image to be processed by the first sub-convolution layers;
  extracting, via the first down-sampling layers in the at least one first sampling layer, feature images with a plurality of spatial sizes from the compressed feature images;
  determining, via the first up-sampling layers, feature images with same spatial sizes as the plurality of spatial sizes;
  obtaining a first splicing feature image by splicing, via the second sub-feature series layer, the feature images with the same spatial sizes on feature dimension; and
  processing, via the second sub-convolution layer, the first splicing feature image, and outputting the second image.

In a possible implementation, the single-frame network includes at least one second convolution layer, at least one second sampling layer and at least one second feature series layer which are cascaded, the at least one second convolution layer includes a third sub-convolution layer and a fourth sub-convolution layer, and the at least one second sampling layer includes second down-sampling layers and second up-sampling layers;
  where the removing, via the single-frame network, the compression noise of the image to be processed to output the first image, includes:
  extracting, via third sub-convolution layers, first feature images of the image to be processed;
  extracting, via the second down-sampling layers, feature images with a plurality of spatial sizes from the first feature images;
  determining, via the second up-sampling layers, feature images with the same spatial sizes as the plurality of spatial sizes;
  obtaining a second splicing feature image by splicing, via the second feature series layer, the feature images with the same spatial sizes on feature dimension; and
  processing, via the fourth sub-convolution layer, the second splicing feature image, and outputting the first image.

In a possible implementation, before inputting, into the target denoising network, the image to be processed, the method further includes:

a training process of the target denoising network, where the training process includes:

obtaining a plurality of groups of image frame sequences, where each group of image frame sequences includes a plurality of images;

encoding the plurality of groups of image frame sequences into a true value video and a simulation video respectively, where each frame of simulation image in the simulation video contains compression noises;

inputting, into a denoising network to be trained, the each frame of simulation image in the simulation video, and outputting a simulation denoised image of a corresponding frame;

determining, according to a first prediction deviation between the simulation denoised image and a true value image of the corresponding frame in the true value video, a first loss function for the denoising network to be trained; and taking a corresponding network when the first loss function is lower than a first preset threshold as the target denoising network.

In a possible implementation, the determining, according to the first prediction deviation between the simulation denoised image and the true value image of the corresponding frame in the true value video, the first loss function for the denoising network to be trained, includes:

adopting, when the first prediction deviation between the simulation denoised image and the true value image of the corresponding frame in the true value video is smaller than or equal to δ, an L2 loss function; and adopting, when the first prediction deviation between the simulation denoised image and the true value image of the corresponding frame in the true value video is greater than δ, an L1 loss function;

where a formula corresponding to the L2 loss function is:

$$L_\delta(y, f(x)) = \frac{1}{2}(y - f(x))^2;$$

and
a formula corresponding to the L1 loss function is:

$$L_\delta(y, f(x)) = \delta \left( |y - f(x)| - \frac{1}{2}\delta \right)^2;$$

where, f(x) represents the simulation denoised image, and y represents the true value image of the frame corresponding to the simulation denoised image in the true value video.

In a possible implementation, after determining, according to the first prediction deviation between the simulation denoised image and the true value image of the corresponding frame in the true value video, the first loss function for the denoising network to be trained, the method further includes:

performing, when the first loss function is lower than the first preset threshold, sharpening processing on each frame of true value image in the true value video, and obtaining a true value video after edge enhancement;

determining a second prediction deviation between the simulation denoised image and the corresponding frame image in the true value video after edge enhancement, and determining a second loss function for the denoising network to be trained; and taking a corresponding network when the second loss function is lower than a second preset threshold as the target denoising network.

In a second aspect, an embodiment of the present disclosure further provides an apparatus for image restoration, including:

an input unit, configured to input, into a target denoising network, an image to be processed, where the target denoising network includes a single-frame network and a recursive network, and the image to be processed is any frame in a video to be processed;

a first processing unit, configured to remove, via the single-frame network, compression noise of the image to be processed to output a first image;

a second processing unit, configured to remove, according to a content of a previous frame image, compression noise of the image to be processed via the recursive network to output a second image, where the previous frame image is one previous frame of the image to be processed in the video to be processed; and an output unit, configured to perform weighted summation on the first image and the second image, and output a denoised image for the image to be processed.

In a third aspect, an embodiment of the present disclosure provides an electronic device for image restoration, including: a memory and a processor;

where the memory is configured to store a program; and
the processor is configured to execute the program in the memory, including:

inputting an image to be processed into a target denoising network, where the target denoising network includes a single-frame network and a recursive network, and the image to be processed is any frame in a video to be processed;

removing, via the single-frame network, compression noise of the image to be processed to output a first image;

removing, according to a content of a previous frame image, compression noise of the image to be processed via the recursive network to output a second image, where the previous frame image is one previous frame of the image to be processed in the video to be processed; and performing weighted summation on the first image and the second image, and outputting a denoised image for the image to be processed.

In a fourth aspect, an embodiment of the present disclosure provides a computer-readable storage medium, storing computer instructions, where the stored computer instructions, when executed by a processor, implement the above image restoration method.

DETAILED DESCRIPTION OF THE EMBODIMENTS

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those ordinarily skilled in the art without creative work shall fall within the protection scope of the present disclosure.

Unless otherwise defined, technical or scientific terms used in the present disclosure shall have the ordinary meanings understood by those ordinarily skilled in the art to which the present disclosure pertains.

The existing method for removing compression noise from a video mainly removes the compression noises in a video compression process. Specifically, in a process of video compression and encoding, the noise generated by compression is reduced as much as possible, which mainly makes the video display higher quality under the same compression degree. The whole processing process cannot realize denoising of the compressed damaged video, and the video quality is poor.

In view of this, embodiments of the present disclosure provide an image restoration method and apparatus, and an electronic device, which are used for removing noise in video compression, thereby improving the display quality.

Before introducing the technical solution provided by the embodiments of the present disclosure, the specific structure of a target denoising network used for image restoration in the embodiments of the present disclosure is briefly described firstly.

Figure 1:
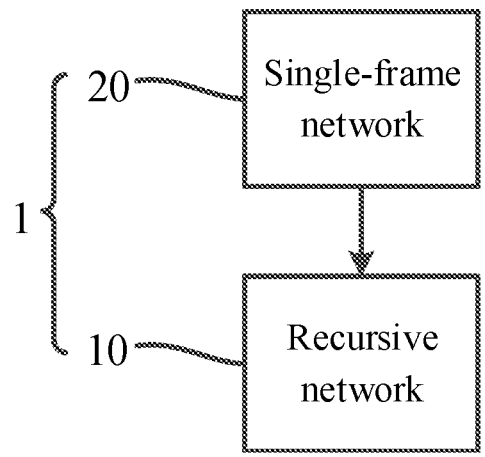
FIG. 1 is a schematic structural diagram of a target denoising network provided by an embodiment of the present disclosure.

As shown in FIG. 1, which is a schematic structural diagram of a target denoising network 1, specifically, the target denoising network 1 includes a single-frame network 20 and a recursive network 10.

Figure 2:
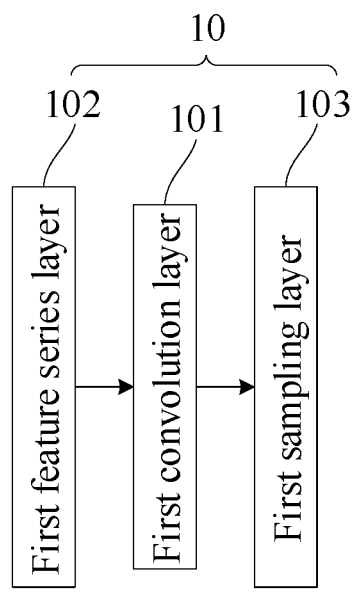
FIG. 2 is a schematic structural diagram of a recursive network provided by an embodiment of the present disclosure.
Figure 3:
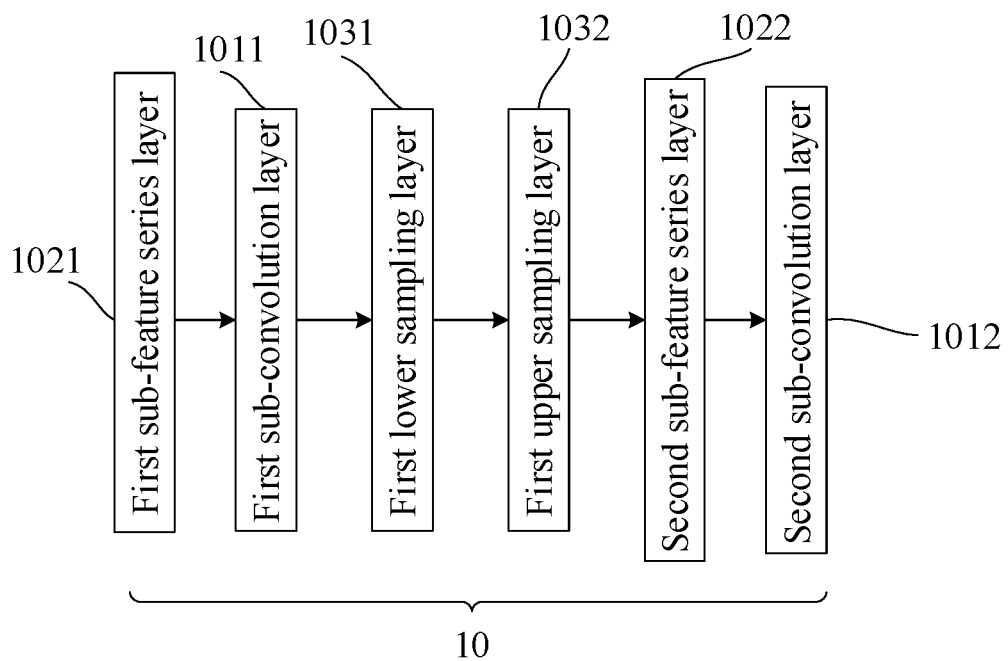
FIG. 3 is a schematic structural diagram of a recursive network provided by an embodiment of the present disclosure.
Figure 4:
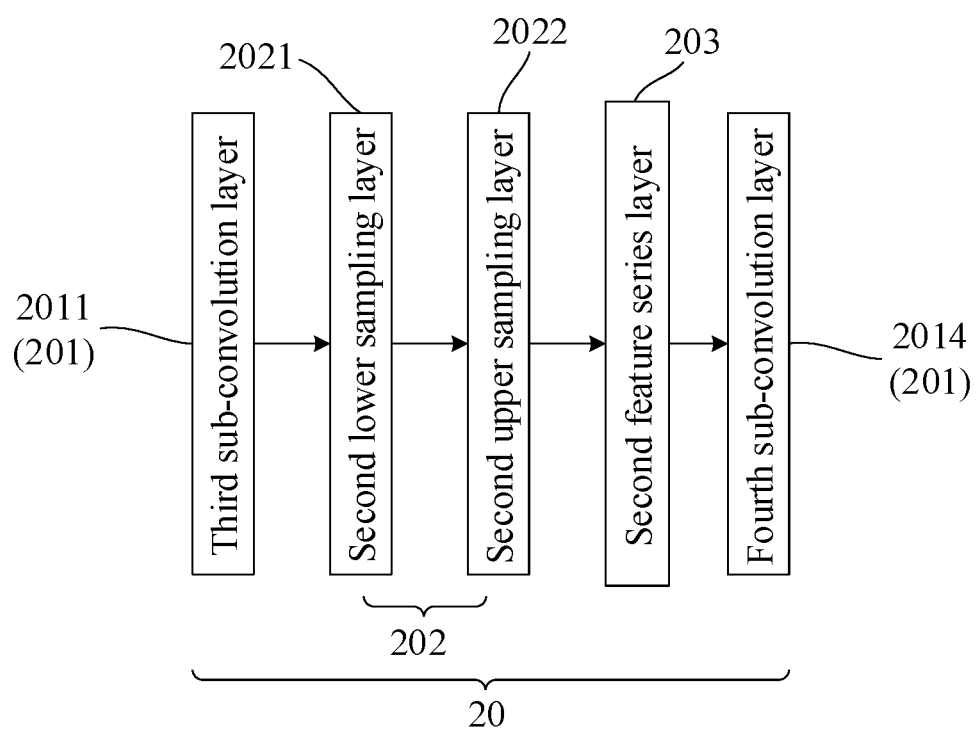
FIG. 4 is a schematic structural diagram of a single-frame network provided by an embodiment of the present disclosure.

As shown in FIG. 2, which is a schematic structural diagram of the recursive network 10, the recursive network 10 includes a first convolution layer 101, a first feature series layer 102 and a first sampling layer 103 which are cascaded. In a specific implementation process, there may be a plurality of structures on each layer in the recursive network 10. As shown in FIG. 3, which is a schematic structural diagram of the recursive network 10, specifically, the first convolution layer 101 in the recursive network 10 includes a first sub-convolution layer 1011 and a second sub-convolution layer 1012, the first feature series layer 102 includes a first sub-feature series layer 1021 and a second sub-feature series layer 1022, and the first sampling layer 103 includes a first down-sampling layer 1031 and a first up-sampling layer 1032. As shown in FIG. 4, the single-frame network 20 includes a second convolution layer 201, a second sampling layer 202 and a second feature series layer 203 which are cascaded, the second convolution layer 201 includes a third sub-convolution layer 2011 and a fourth sub-convolution layer 2014, and the second sampling layer 202 includes a second down-sampling layer 2021 and a second up-sampling layer 2022.

In a specific implementation process, network structures of the single-frame network 20 and the recursive network 10 are generally the same. For example, a second convolution layer 201 of the single-frame network 20 includes N third sub-convolution layers 2011, and correspondingly, a first convolution layer 101 of the recursive network 10 also includes N first sub-convolution layer 1011, where N is an integer greater than 1. In addition, locations of the sub-convolution layers in the single-frame network 20 and the recursive network 10 are also generally the same. There may be a plurality of first down-sampling layers 1031, and correspondingly, there may also be a plurality of first up-sampling layers 1032. For example, there are two first down-sampling layers 1031, and correspondingly, there are two first up-sampling layers 1032.

Figure 5:
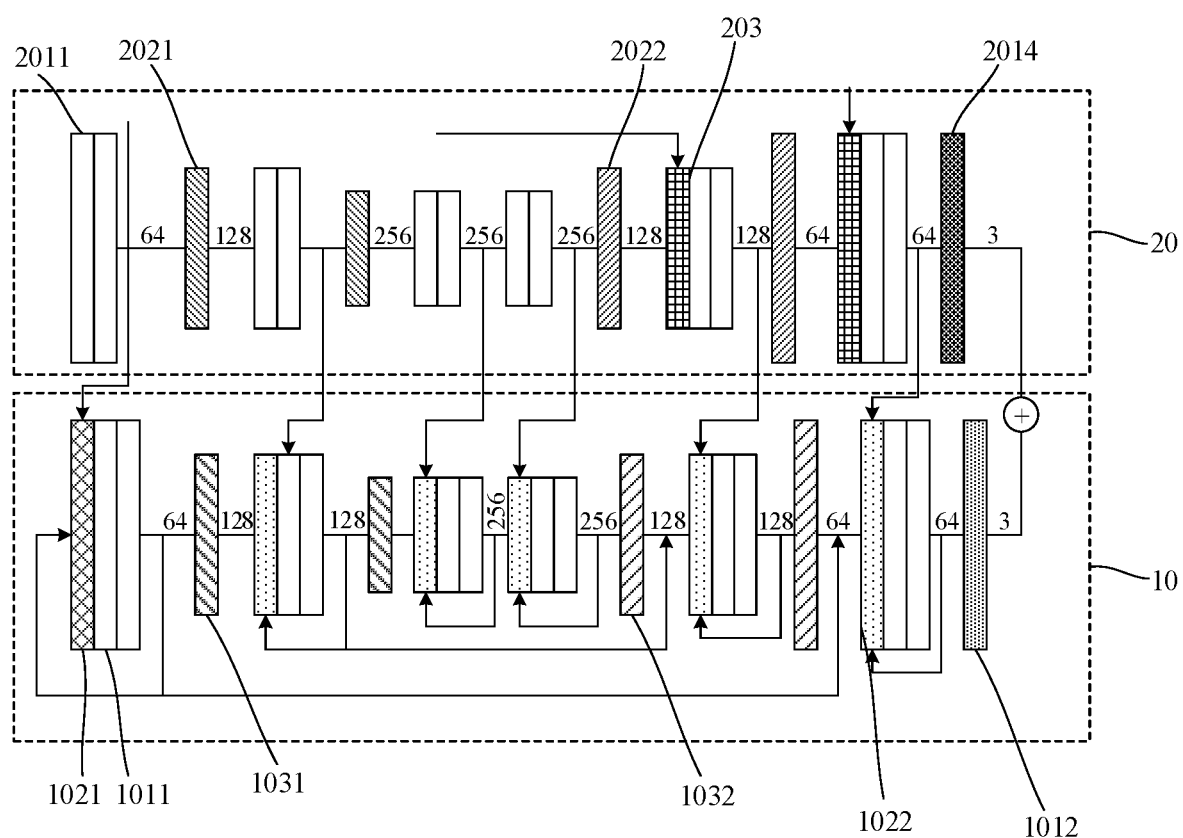
FIG. 5 is a schematic structural diagram of a target denoising network provided by an embodiment of the present disclosure.

In the embodiment of the present disclosure, as shown in FIG. 5, which is a schematic structural diagram of the target denoising network 1, specifically, when there are two first down-sampling layers 1031, two up-sampling layers included in the first up-sampling layer 1032, one second sub-convolution layer 1012, one first sub-feature series layer 1021, two second down-sampling layers 2021, two second up-sampling layers 2022, one fourth sub-convolution layer 2014 and two second feature series layers 203. The number of filters of each convolution layer in the network is shown as the number above a horizontal line in FIG. 5, such as 64 and 128.

In a specific implementation process, the size of a convolution core of each convolution layer may be 3×3, the stride is 1, the input of each convolution layer is filled with 0 with a pad size of 1, so as to ensure that the input size and output size of each convolution layer are equal, and after being output by each convolution layer, a relu activation function may be used to perform nonlinear operation on the output. For each down-sampling layer, a convolution layer with the stride of 2 may be used to perform 2× down-sampling of the spatial dimension of a feature image, and the size of the convolution core is 3×3. For each up-sampling layer, the convolution layer and a depth to space layer may be adopted to perform 2× up-sampling of the spatial dimension of the feature image. First, the feature dimension of the input feature image is expanded to four times the original by the convolution layer, the size of the convolution core is 3×3, the stride is 1, and then, expansion of the feature dimension of the feature image is converted into enlargement of the spatial dimension by the depth to space layer. For each feature series layer, it is mainly to extract feature images of different scales from the single-frame network 20 and feature images of corresponding scales of the recursive network 10 for series operation on the feature dimension, followed by a convolution layer to compress the feature dimension.

In a specific implementation process, image restoration is performed on any frame of image to be processed in a video to be processed by the target denoising network 1 composed of the single-frame network 20 and the recursive network 10, and the specific processing process of each layer in the target denoising network 1 will be described later, which will not be detailed here.

Figure 6:
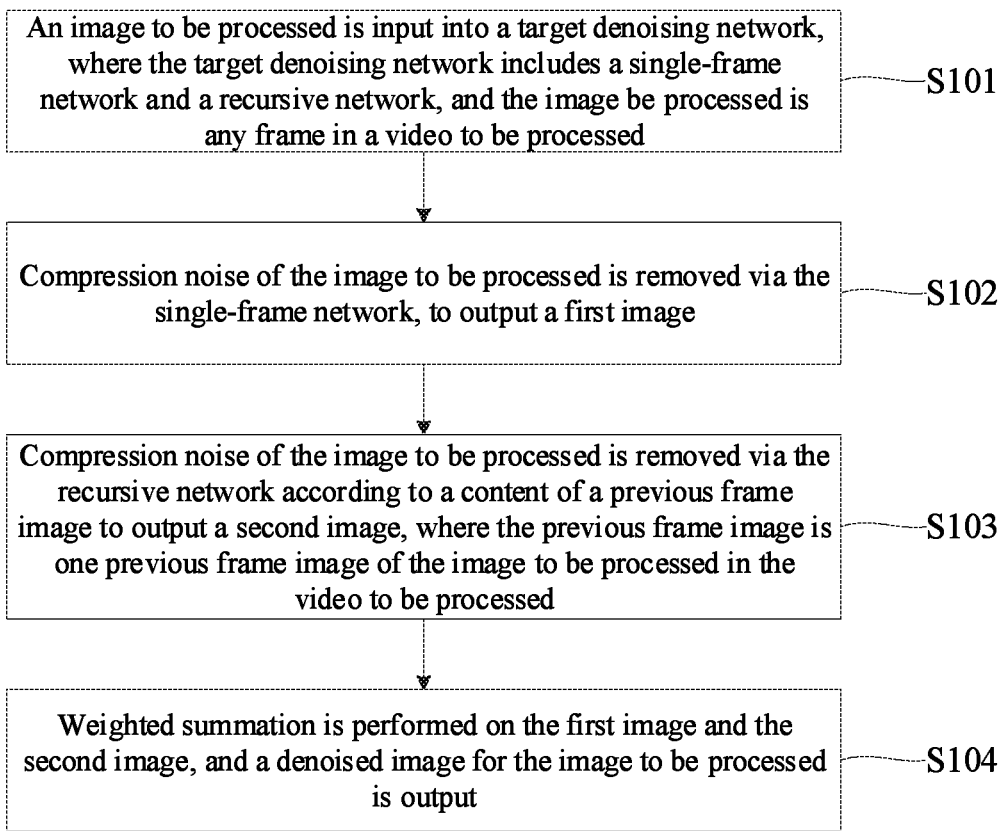
FIG. 6 is a flow chart of an image restoration method provided by an embodiment of the present disclosure.

As shown in FIG. 6, which is a flow chart of an image restoration method provided by an embodiment of the present disclosure, specifically, the image restoration method includes the following.

S101, an image to be processed is input into a target denoising network, where the target denoising network includes a single-frame network and a recursive network, and the image be processed is any frame in a video to be processed.

In a specific implementation process, the video to be processed may be a compressed video, for example, a frame rate of an original video is 30, a code rate is 100 M, and the video to be processed is a video after the code rate of its original video is compressed to be 2 M. The single-frame network and the recursive network in the target denoising network may be the same encoding and decoding structure, and both may be a recurrent neural network (RNN) network model. In a specific implementation process, the target denoising network may be a trained network. The image to be processed is any frame of image in the video to be processed.

S102, compression noise of the image to be processed is removed via the single-frame network, to output a first image.

S103, compression noise of the image to be processed is removed via the recursive network according to a content of a previous frame image to output a second image, where the previous frame image is one previous frame image of the image to be processed in the video to be processed.

In a specific implementation process, the content of the previous frame image may be semantic information of the previous frame image, and the semantic information may be a feature image extracted from the previous frame image by each convolution layer in the recursive network. According to the content of the previous frame image, compression noise of the image to be processed may be removed by the recursive network, to output the second image. That is, the recursive network may remove compression noises according to the relation between the previous frame and later frame in the video to be processed, for example, the relation between the previous frame and later frame may be a motion relation, and then the second image is output. Since the second image is the image obtained after removing compression noise by using the relation between the previous frame and later frame, the display effect of the obtained second image is better.

S104, weighted summation is performed on the first image and the second image, and a denoised image for the image to be processed is output.

In a specific implementation, after outputting the first image and the second image, weighted summation may be performed on the first image and the second image, and the image after weighted summation is taken as the denoised image for the image to be processed. Since the single-frame network directly performs denoising on the image to be processed, the denoising degree is better. In addition, due to the relation between the previous frame and later frame, while ensuring the details of the previous frame and later frame, the recursive network performs denoising processing on the image to be processed, which is conducive to ensuring the video quality.

In a specific implementation process, for example, the first image P1 and the second image P2 after weighted processing is a×P1+b×P2, correspondingly, the denoised image P after the target denoising network performs denoising processing on the image to be processed may be a×P1+b×P2, where a represents a weighted coefficient of the first image P1, b represents a weighted coefficient of the second image P2, and a+b=1. In a specific implementation process, the weighted coefficients of the first image P1 and the second image P2 may be set according to actual needs, for example, when a>b, the denoising ability of the image to be processed is stronger; and for another example, when a<b, details between the image to be processed and the previous frame image are more consistent, and the display effect is better. Of course, those skilled in the art may set the weighted coefficients of the first image P1 and the second image P2 according to the actual needs, which is not limited here.

In the embodiments of the present disclosure, the step S103 that compression noise of the image to be processed is removed via the recursive network according to the content of the previous frame image to output the second image, where the previous frame image is one previous frame image of the image to be processed in the video to be processed, includes:

removing compression noise of the image to be processed via at least one first convolution layer, at least one first feature series layer and at least one first sampling layer cascaded in the recursive network, to output the second image.

In a specific implementation process, there are at least one first convolution layer, at least one first feature series layer, and at least one first sampling layer. Compression noise of the image to be processed is removed via the first convolution layer, the first feature series layer and the first sampling layer cascaded in the recursive network; and because the recursive network fully considers the content in the previous frame of image, the consistency of the image contents after video denoising is improved, and the display quality is improved.

Figure 7:
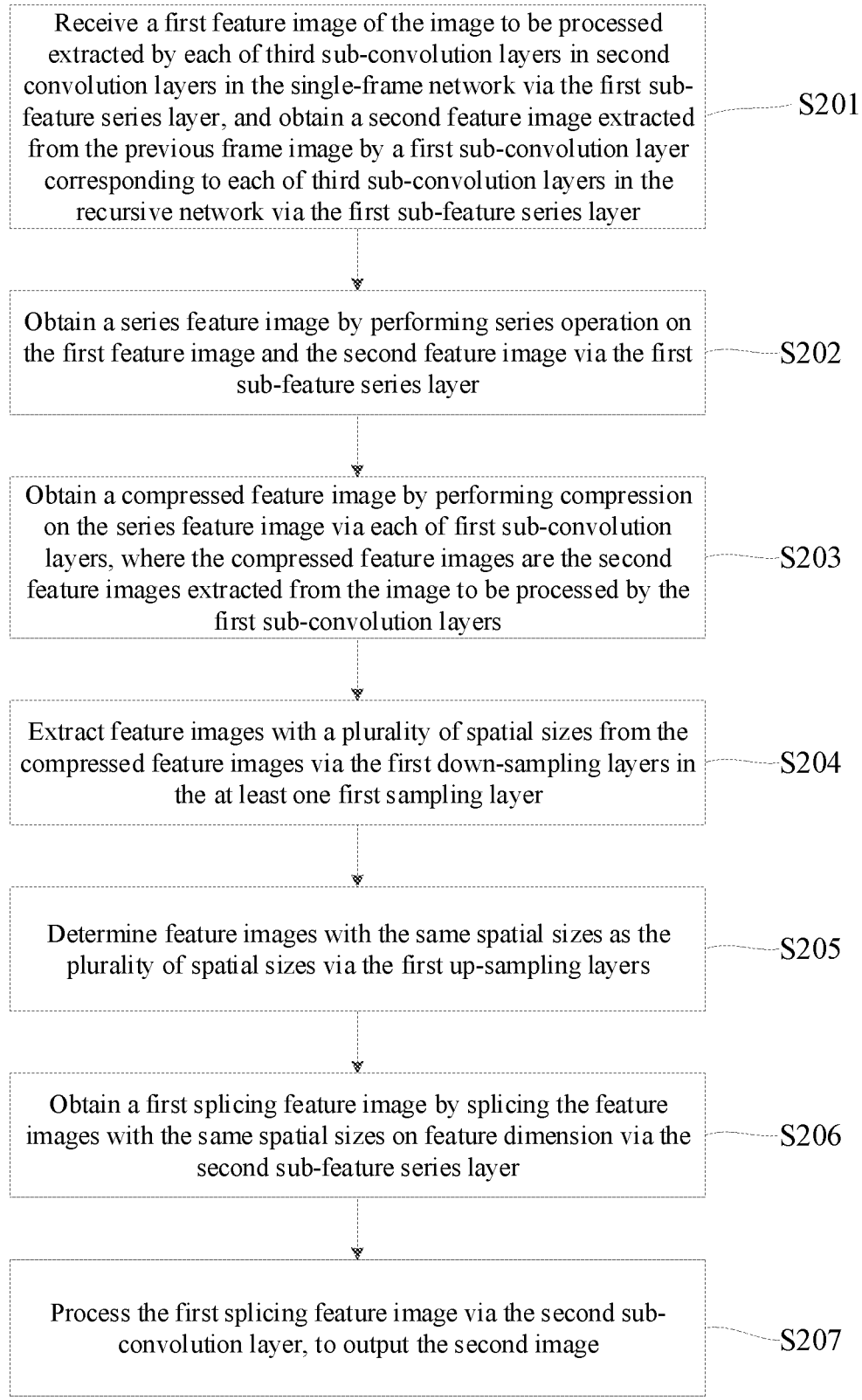
FIG. 7 is a flow chart of step S103 in an image restoration method provided by an embodiment of the present disclosure.

In the embodiment of the present disclosure, as shown in FIG. 7, the step that compression noise of the image to be processed is removed via the at least one first convolution layer, the at least one first feature series layer and the at least one first sampling layer cascaded in the recursive network to output the second image, includes:

S201, receiving a first feature image of the image to be processed extracted by each of third sub-convolution layers in second convolution layers in the single-frame network via the first sub-feature series layer, and obtaining a second feature image extracted from the previous frame image by a first sub-convolution layer corresponding to each of third sub-convolution layers in the recursive network via the first sub-feature series layer;

S202, obtaining a series feature image by performing series operation on the first feature image and the second feature image via the first sub-feature series layer;

S203, obtaining a compressed feature image by performing compression on the series feature image via each of first sub-convolution layers, where the compressed feature images are the second feature images extracted from the image to be processed by the first sub-convolution layers;

S204, extracting feature images with a plurality of spatial sizes from the compressed feature images via the first down-sampling layers in the at least one first sampling layer;

S205, determining feature images with the same spatial sizes as the plurality of spatial sizes via the first up-sampling layers;

S206, obtaining a first splicing feature image by splicing the feature images with the same spatial sizes on feature dimension via the second sub-feature series layer; and S207, processing the first splicing feature image via the second sub-convolution layer, to output the second image.

In a specific implementation process, a specific implementation process of step S201 to step S207 is as follows.

First, the first feature image of the image to be processed extracted by each of third sub-convolution layers in second convolution layers in the single-frame network is received via the first sub-feature series layer, and the second feature image extracted from the previous frame image by the first sub-convolution layer corresponding to each third sub-convolution layer in the recursive network is obtained via the first sub-feature series layer, where there may be a plurality of third sub-convolution layers in the single-frame network, and there may also be a plurality of first sub-convolution layers in the recursive network. When the first feature image is extracted from the image to be processed via one of the third sub-convolution layers of the single-frame network, the second feature image may be extracted from the previous frame image via the first sub-convolution layer corresponding to the third sub-convolution layer in the recursive network. In a specific implementation process, any one of the plurality of third sub-convolution layers may extract the corresponding feature image from the image to be processed. Accordingly, any one of the plurality of first sub-convolution layers may extract the corresponding feature image from the previous frame image.

After the first feature image and the second feature image are received via each first sub-feature series layer, series operation is performed on the first feature image and the second feature image via the corresponding first sub-feature series layer, and the series feature image is obtained. The series feature image includes a feature relation between the previous frame image and later frame image. Then, the series feature image is compressed via each first sub-convolution layer, a compressed feature image is obtained, and the compressed feature image may be the second feature image extracted from the image to be processed via each first sub-convolution layer. For example, the compressed feature image may be the second feature image extracted from the image to be processed via the first sub-convolution layer when the target denoising network performs denoising processing on the later frame image after the image to be processed.

Then, feature images with a plurality of spatial sizes are extracted from the compressed feature images via the first down-sampling layers in the at least one first sampling layer. There may be a plurality of first down-sampling layers, each down-sampling layer extracts the feature image with a corresponding spatial size, the plurality of down-sampling layers extract the feature images with different spatial sizes respectively, and any two of the plurality of spatial sizes are different in size. For example, if there are two first down-sampling layers, feature images with two spatial sizes may be extracted from the compressed feature images, where the feature images with two spatial sizes are feature images with two different spatial sizes. For another example, if there are three first down-sampling layers, feature images with three spatial sizes may be extracted from the compressed feature images (for example, the three spatial sizes are A, 0.5A and 0.25A, where A is 500*500), where the feature images with three spatial sizes are the feature images with three different spatial sizes. Therefore, the compressed feature images are processed in different spatial sizes via the plurality of first down-sampling layers.

Then, feature images with the same spatial sizes as the plurality of spatial sizes are determined via the first up-sampling layers, for example, feature images with the same spatial sizes as three spatial sizes are determined via the first up-sampling layers. For example, after a feature image with a spatial size of 0.25A passes through a first up-sampling layer, a feature image with a spatial size of 0.5A is obtained; and after a feature image with a spatial size of 0.5A passes through a first up-sampling layer again, a feature image with a spatial size of A is obtained; that is to say, after up-sampling twice, feature images with the same spatial sizes as three spatial sizes may be determined, where the same spatial sizes are 0.5A and A. In a specific implementation, there may be a plurality of first up-sampling layers, and the feature image with the same spatial size as the plurality of spatial sizes may be determined via each first up-sampling layer.

Then, the feature images with the same spatial sizes are spliced on feature dimension via the second sub-feature series layer, and a first splicing feature image is obtained. Then, the first splicing feature image is processed via the second sub-convolution layer to output the second image. Therefore, the second image is output via processing among layers in the first convolution layer, the first feature series layer and the first sampling layer cascaded in the recursive network.

Figure 8:
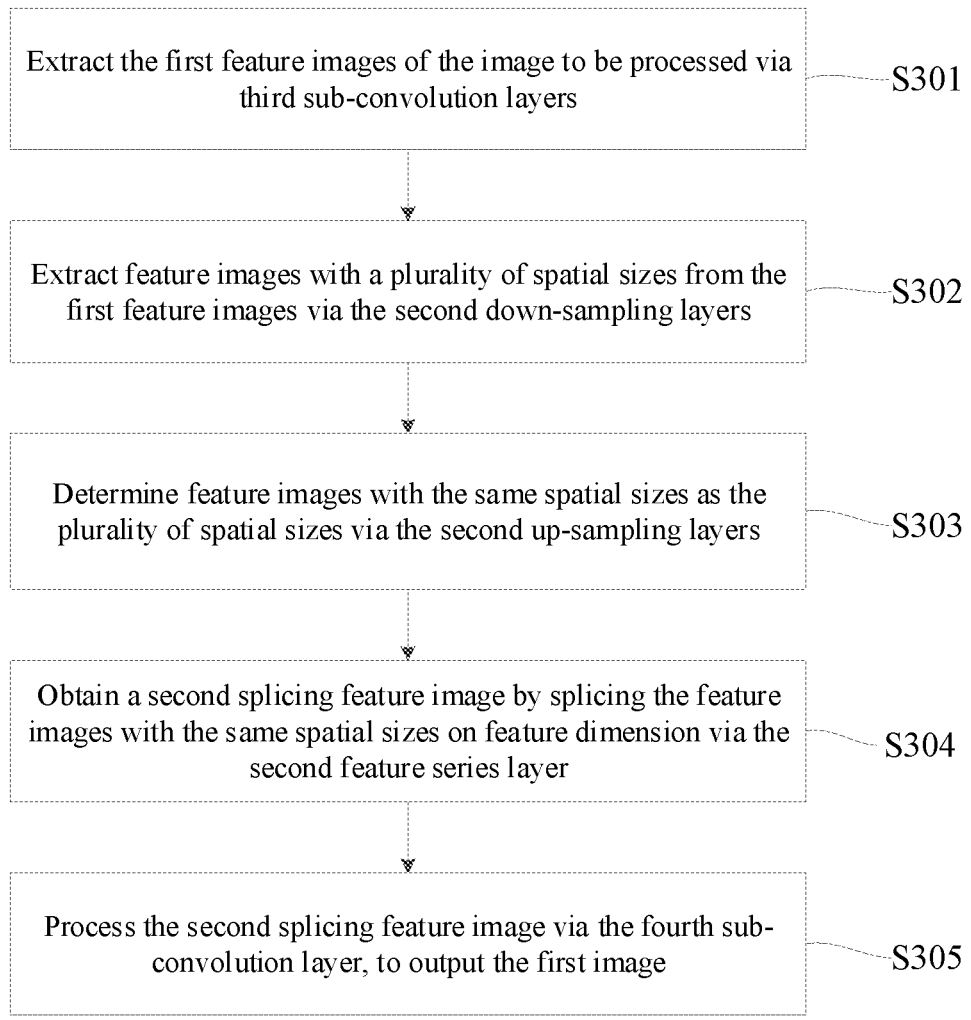
FIG. 8 is a flow chart of step S102 in an image restoration method provided by an embodiment of the present disclosure.

In the embodiment of the present disclosure, as shown in FIG. 8, the step S102 that the compression noise of the image to be processed is removed via the single-frame network to output the first image, includes:

S301, extracting the first feature images of the image to be processed via third sub-convolution layers;

S302, extracting feature images with a plurality of spatial sizes from the first feature images via the second down-sampling layers;

S303, determining feature images with the same spatial sizes as the plurality of spatial sizes via the second up-sampling layers;

S304, obtaining a second splicing feature image by splicing the feature images with the same spatial sizes on feature dimension via the second feature series layer; and S305, processing the second splicing feature image via the fourth sub-convolution layer, to output the first image.

In a specific implementation process, a specific implementation process of step S301 to step S305 is as follows.

First, the first feature images of the image to be processed are extracted via third sub-convolution layers in the single-frame network, then the feature images with the plurality of spatial sizes are extracted from the first feature images via the second down-sampling layers in the single-frame network, where there may be a plurality of second down-sampling layers, each down-sampling layer extracts the feature image with a corresponding spatial size, the plurality of down-sampling layers extract the feature images with different spatial sizes respectively, and any two of the plurality of spatial sizes are different in size. Then, feature images with the same spatial sizes as the plurality of spatial sizes are determined via the second up-sampling layers in the single-frame network. For example, feature images with two different spatial sizes are extracted from the first feature images by the second down-sampling layers, and correspondingly, the feature image with the same spatial size as the two different spatial sizes is determined from the second up-sampling layer. Then the feature images with the same spatial sizes are spliced on the feature dimension via the second feature series layer in the single-frame network, and the second splicing feature image is obtained. Then, the second splicing feature image is processed via the fourth sub-convolution layer in the single-frame network, and the first image is output.

Figure 9:
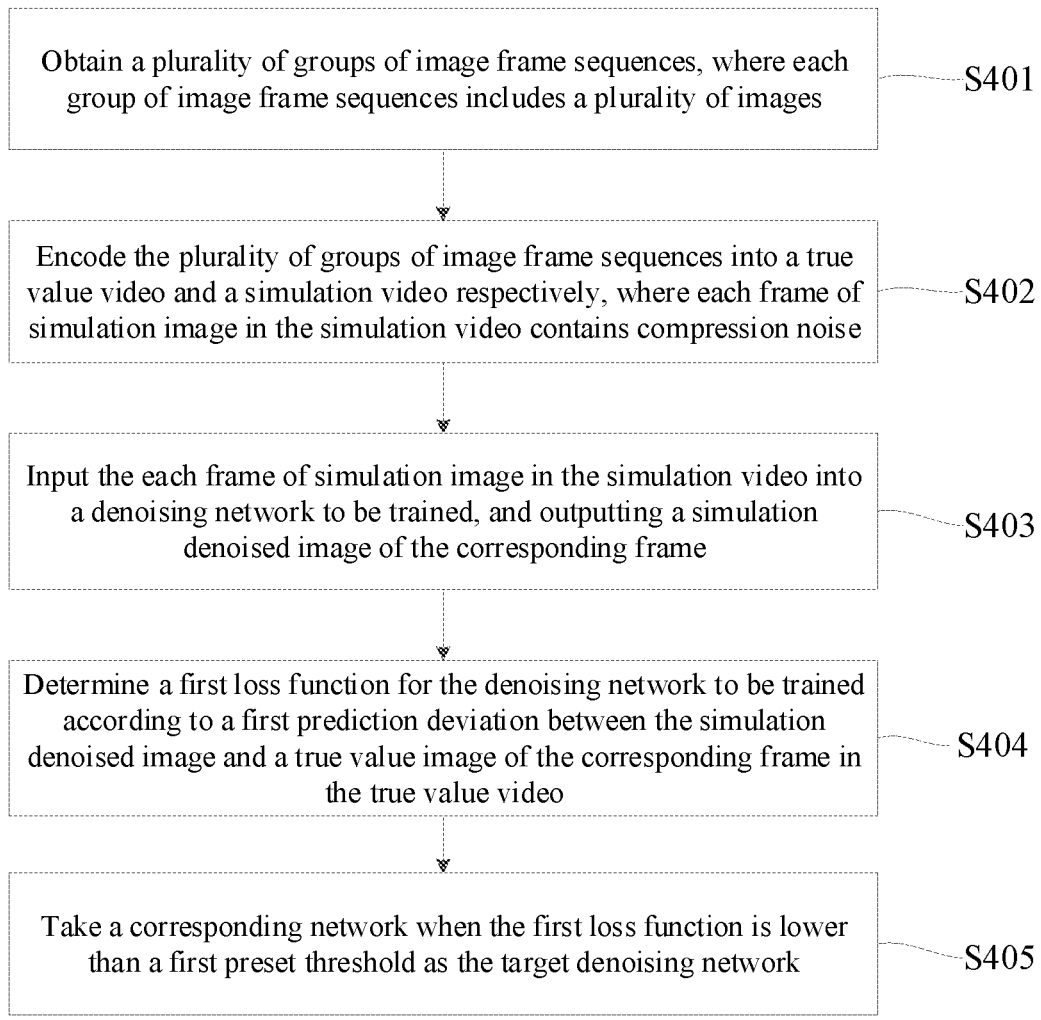
FIG. 9 is a flow chart before step S101 in an image restoration method provided by an embodiment of the present disclosure.

In the embodiment of the present disclosure, as shown in FIG. 9, before the step S101 that the image to be processed is input into the target denoising network, the method further includes: a training process of the target denoising network, specifically executing:

S401, obtaining a plurality of groups of image frame sequences, where each group of image frame sequences includes a plurality of images;

S402, encoding the plurality of groups of image frame sequences into a true value video and a simulation video respectively, where each frame of simulation image in the simulation video contains compression noise;

S403, inputting the each frame of simulation image in the simulation video into a denoising network to be trained, and outputting a simulation denoised image of the corresponding frame;

S404, determining a first loss function for the denoising network to be trained according to a first prediction deviation between the simulation denoised image and a true value image of the corresponding frame in the true value video; and S405, taking a corresponding network when the first loss function is lower than a first preset threshold as the target denoising network.

In a specific implementation process, a specific implementation process of step S401 to step S405 is as follows.

First, a plurality of groups of image frame sequences are obtained, and each group of image frame sequences includes the plurality of images. For example, a training set provided by architects in mission (AIM) competition hosted by ICCV-2019 is taken as training data, the training set totally includes 240 groups of frame sequences, each group of frame sequences contains 181 clear images of 1280×720, and the target denoising network is trained. Specifically, the training set is processed as follows: first, the plurality of groups of image frame sequences are encoded into the true value video and the simulation video respectively, where each frame of simulation image in the simulation video contains the compression noise, for example, ffmpeg is used to encode the above 240 groups of frame sequences into a video of an MP4 format as the true value video of the training set; where the encoding format is H.264, a frame rate is 25, and a code rate is about 130 M. The ffmpeg is used to perform H.264 encoding on the above 240 groups of frame sequences, the frame rate is 25, the code rate is compressed to be about 2 M, and a simulation video containing the compression noises and artifacts is generated. Then, each frame of simulation image in the simulation video is input into the denoising network to be trained, and a simulation denoised image of the corresponding frame is output. Then, according to the first prediction deviation between the simulation denoised image and the true value image of the corresponding frame in the true value video, the first loss function for the denoising network to be trained is determined, and then the corresponding network when the first loss function is lower than the first preset threshold is taken as the target denoising network. Those skilled in the art may set the specific value of the first preset threshold according to the actual needs, which is not limited here.

In the embodiment of the present disclosure, in the step S404 of determining a first loss function for the denoising network to be trained according to the first prediction deviation between the simulation denoised image and the true value image of the corresponding frame in the true value video, according to a value between the first prediction deviation and a set deviation value $\delta$, there may be the following two cases:

in a first case, when the first prediction deviation between the simulation denoised image and the true value image of the corresponding frame in the true value video is smaller than or equal to $\delta$, an L2 loss function is adopted; and in a second case, when the first prediction deviation between the simulation denoised image and the true value image of the corresponding frame in the true value video is greater than $\delta$, an L1 loss function is adopted.

A formula corresponding to the L2 loss function is:

$$L_\delta(y, f(x)) = \frac{1}{2}(y - f(x))^2;$$

and a formula corresponding to the L1 loss function is:

$$L_\delta(y, f(x)) = \delta\left(|y - f(x)| - \frac{1}{2}\delta\right)^2;$$

where, f(x) represents the simulation denoised image, and y represents the true value image of the frame corresponding to the simulation denoised image in the true value video.

In a specific implementation process, the set deviation value $\delta$ may be 1. Of course, those skilled in the art may set the value of $\delta$ according to practical applications, which is not limited here.

Figure 10:
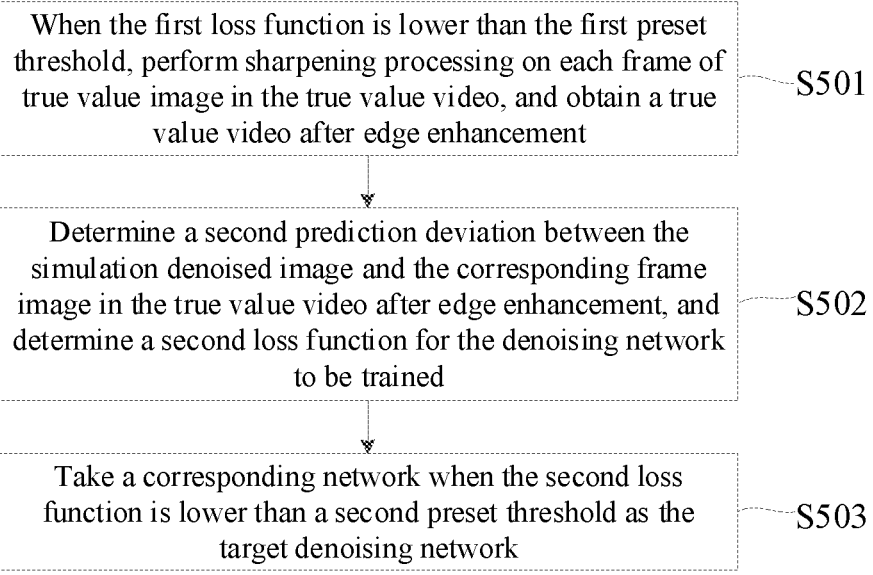
FIG. 10 is a flow chart after step S404 in an image restoration method provided by an embodiment of the present disclosure.

In the embodiment of the present disclosure, as shown in FIG. 10, after the step S404 of determining the first loss function for the denoising network to be trained according to the first prediction deviation between the simulation denoised image and the true value image of the corresponding frame in the true value video, the method further includes:

S501, when the first loss function is lower than the first preset threshold, performing sharpening processing on each frame of true value image in the true value video, and obtaining a true value video after edge enhancement;

S502, determining a second prediction deviation between the simulation denoised image and the corresponding frame image in the true value video after edge enhancement, and determining a second loss function for the denoising network to be trained; and S503, taking a corresponding network when the second loss function is lower than a second preset threshold as the target denoising network.

In a specific implementation process, a specific implementation process of step S501 to step S503 is as follows.

First, when the first loss function is lower than the first preset threshold, sharpening processing is performed on each frame of true value image in the true value video, and the true value video after edge enhancement is obtained, where an Adam optimization algorithm may be used to optimize network parameters in the denoising network to be trained, and the true value video and the corresponding simulation video are used for training at the beginning of the training. When the first loss function is lower than the first preset threshold, the denoising network to be trained after training can restore the image content relative completely, at this time, sharpening processing is performed on each frame image in the true value video, which is taken as a target function y in the loss function, and the denoising network is continuously trained. Specifically, the second prediction deviation between the simulation denoised image and the corresponding frame image in the true value video after edge enhancement is determined, and the second loss function for the denoising network to be trained is determined, specifically, the second loss function for the denoising network to be trained is still determined by using the same formula as that used for calculating the first loss function, which will not be detailed here. Then, the corresponding network when the second loss function is lower than the second preset threshold is taken as the target denoising network. Since in the training process of the denoising network to be trained, the true value video is firstly enhanced, and then the denoising network to be trained is enhanced, which is conducive to reducing the blurring degree of the denoised image, the clarity of the denoised image can be effectively improved, the image details are better restored, and thus the quality of a reconstructed image is improved.

In a specific implementation process, when the denoising network to be trained is trained, in order to improve the training efficiency, it may be to cut each group of input image frame sequences into blocks, and the size of each image block is 256×256, so that the whole image is cut into 15 patches as a batch. A network learning rate may be set as $10^{\wedge}(-4)$, an attenuation coefficient of the learning rate may be 0.8, the learning rate is reduced to 0.8 time of the original when each epoch is trained, and thus the stability of the network training is improved. In addition, the epoch may be set as 100, the network totally trains 100 epochs, and when the network has trained to the last 10 epochs, the model effect obtained by each epoch will no longer change significantly. Of course, each parameter for training the denoising network to be trained may further be set according to the practical applications, which is not limited here.

In the embodiments of the present disclosure, the principle for solving problems of the target denoising network used for image restoration is similar to the above image restoration method, so the implementation of the target denoising network may refer to the implementation of the above image restoration method, and repetitions will not be made.

Figure 11:
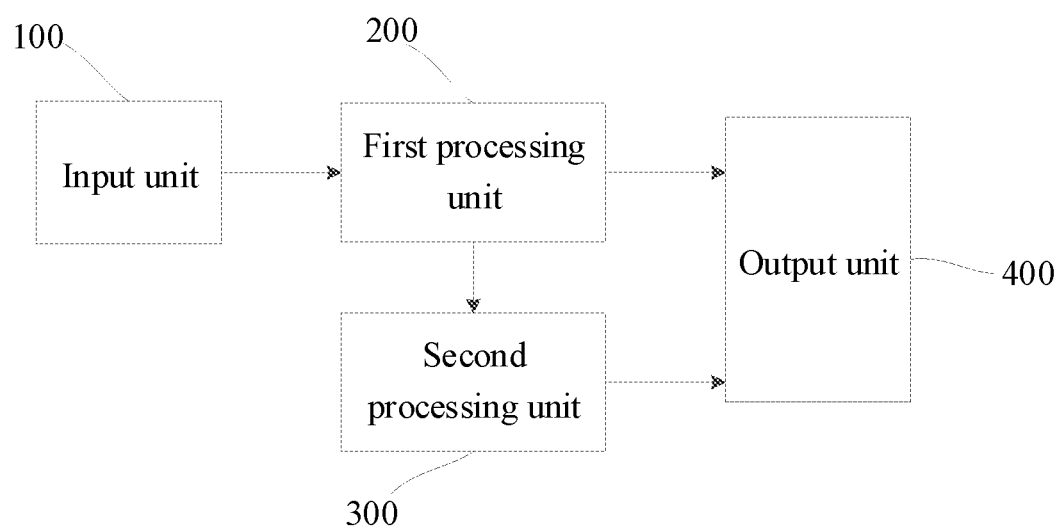
FIG. 11 is a schematic structural diagram of an apparatus for image restoration provided by an embodiment of the present disclosure.

Based on the same inventive concept, as shown in FIG. 11, an embodiment of the present disclosure further provides an apparatus for image restoration, including:

an input unit 100, configured to input an image to be processed into a target denoising network, where the target denoising network includes a single-frame network and a recursive network, and the image be processed is any frame in a video to be processed;

a first processing unit 200, configured to remove, via single-frame network, compression noise of the image to be processed to output a first image;

a second processing unit 300, configured to remove, according to a content of a previous frame image, compression noise of the image to be processed via the recursive network to output a second image, where the previous frame image is one previous frame of the image to be processed in the video to be processed; and an output unit 400, configured to perform weighted summation on the first image and the second image, and output a denoised image for the image be processed.

In the embodiment of the present disclosure, the second processing unit 300 is configured to:

remove the compression noise of the image to be processed via at least one first convolution layer, at least one first feature series layer and at least one first sampling layer cascaded in the recursive network, to output the second image.

In the embodiment of the present disclosure, the second processing unit 300 is configured to:

receive, via a first sub-feature series layer, a first feature image of an image to be processed extracted by each of third sub-convolution layers in second convolution layers in the single-frame network, and obtain, via the first sub-feature series layer, a second feature image extracted from a previous frame image by a first sub-convolution layer corresponding to each of third sub-convolution layers in the recursive network;

obtain a series feature image by performing, via the first sub-feature series layer, series operation on the first feature image and the second feature image;

obtain a compressed feature image by performing, via each of first sub-convolution layers, compression on the series feature image, where the compressed feature images are the second feature images extracted from the image to be processed by first sub-convolution layers;

extract, via first down-sampling layers in the at least one first sampling layer, feature images with a plurality of spatial sizes from the compressed feature images;

determine, via first up-sampling layers, feature images with the same spatial sizes as the plurality of spatial sizes;

obtain a first splicing feature image by splicing, via a second sub-feature series layer, the feature images with the same spatial sizes on feature dimension; and process, via the second sub-convolution layer, the first splicing feature image, and output the second image.

In the embodiment of the present disclosure, the first processing unit 200 is configured to:

extract, via third sub-convolution layers, first feature images of the image to be processed;

extract, via the second down-sampling layers, feature images with a plurality of spatial sizes from the first feature images;

determine, via the second up-sampling layers, feature images with the same spatial sizes as the plurality of spatial sizes;

obtain a second splicing feature image by splicing, via a second feature series layer, the feature images with the same spatial sizes on feature dimension; and process, via a fourth sub-convolution layer, the second splicing feature image, and output a first image.

In the embodiment of the present disclosure, before the input unit 100 inputs the image to be processed into the target denoising network, the apparatus for image restoration further includes: a training unit, configured to:

obtain a plurality of groups of image frame sequences, where each group of image frame sequences includes a plurality of images;

encode the plurality of groups of image frame sequences into a true value video and a simulation video respectively, where each frame of simulation image in the simulation video contains compression noise;

input the each frame of simulation image in the simulation video into a denoising network to be trained, and output a simulation denoised image of the corresponding frame;

determine, according to a first prediction deviation between the simulation denoised image and a true value image of the corresponding frame in the true value video, a first loss function for the denoising network to be trained; and take a corresponding network when the first loss function is lower than a first preset threshold as the target denoising network.

In the embodiment of the present disclosure, the training unit is configured to:

adopt, when the first prediction deviation between the simulation denoised image and the true value image of the corresponding frame in the true value video is smaller than or equal to δ, an L2 loss function; and adopt, when the first prediction deviation between the simulation denoised image and the true value image of the corresponding frame in the true value video is greater than δ, an L1 loss function;

where a formula corresponding to the L2 loss function is:

$$L_\delta(y, f(x)) = \frac{1}{2}(y - f(x))^2;$$

and a formula corresponding to the L1 loss function is:

$$L_\delta(y, f(x)) = \delta \cdot \left(|y - f(x)| - \frac{1}{2}\delta\right)^2;$$

where, f(x) represents the simulation denoised image, and y represents the true value image of the frame corresponding to the simulation denoised image in the true value video.

In the embodiment of the present disclosure, the training unit is further configured to:

perform, when the first loss function is lower than a first preset threshold, sharpening processing on each frame of true value image in the true value video, and obtain a true value video after edge enhancement;

determine a second prediction deviation between the simulation denoised image and the corresponding frame image in the true value video after edge enhancement, and determine a second loss function for the denoising network to be trained; and take a corresponding network when the second loss function is lower than a second preset threshold as the target denoising network.

In the embodiments of the present disclosure, the principle for solving problems of the apparatus for image restoration is similar to the above image restoration method, so the implementation of the apparatus for image restoration may refer to the implementation of the above image restoration method, and repetitions will not be made.

Figure 12:
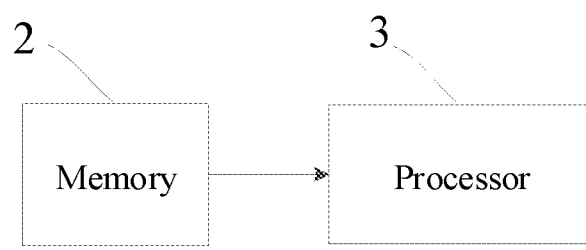
FIG. 12 is a schematic structural diagram of an electronic device for image restoration provided by an embodiment of the present disclosure.

Based on the same inventive concept, as shown in FIG. 12, an embodiment of the present disclosure provides an electronic device for image restoration, including: a memory 2 and a processor 3; where the memory 2 is configured to store a program; the processor 3 is configured to execute the program in the memory 2, including:

inputting an image to be processed into a target denoising network, where the target denoising network includes a single-frame network and a recursive network, and the image to be processed is any frame in a video to be processed;

removing, via the single-frame network, compression noise of the image to be processed to output a first image;

removing, according to a content of a previous frame image, compression noise of the image to be processed via the recursive network to output a second image, where the previous frame image is one previous frame of the image to be processed in the video to be processed; and performing weighted summation on the first image and the second image, and outputting a denoised image for the image to be processed.

The processor 3 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present disclosure. The general-purpose processor may be a microprocessor, or any conventional processor, etc. The steps of the image restoration method disclosed in conjunction with the embodiments of the present disclosure may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 2, and the processor 3 reads information in the memory 2, and completes the steps of the signal processing flow in combination with its hardware.

Specifically, the processor 3 is configured to read the program in the memory 2 and execute any step of the above image restoration method.

Based on the same inventive concept, an embodiment of the present disclosure further provides a computer-readable storage medium storing computer instructions, where instructions, when executed by a processor, can implement the steps of the above image restoration method.

The embodiments of the present disclosure provide the image restoration method and apparatus, and the electronic device. According to the method, any frame of image to be processed in the video to be processed is input into the target denoising network composed of the single-frame network and the recursive network, compression noise of the image to be processed is removed via the single-frame network, and the first image is output; according to the content of the previous frame image of the image to be processed in the video to be processed, compression noise of the image to be processed is removed via the recursive network, and the second image is output; and then, weighted summation is performed on the first image and the second image, and a denoised image for the current frame image is output. That is, compression noise of any frame of image to be processed in the video to be processed needs to be removed according to the combination of the current frame of image to be processed and the previous frame image, so that the compression noise of any frame of image in the video to be processed is removed, and the display quality is improved. In addition, because the relation between the previous frame image and later frame image is used in the whole process of removing compression noises, a motion compensation between frames can be realized, and thus the video quality is improved.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including but not limited to a disk memory, a CD-ROM, an optical memory and the like) containing computer available program codes.

The present disclosure is described with reference to the flow diagrams and/or block diagrams of the method, apparatus (system), and computer program product according to the present disclosure. It should be understood that each flow and/or block in the flow chart and/or block diagram and the combination of flows and/or blocks in the flow chart and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow chart and/or one or more blocks of the block diagram.

These computer program instructions can also be stored in a computer-readable memory capable of guiding the computer or other programmable data processing devices to work in a specific manner, so that the instructions stored in the computer-readable memory generate a manufacturing product including an instruction apparatus, and the instruction apparatus implements the functions specified in one or more flows of the flow chart and/or one or more blocks of the block diagram.

These computer program instructions can also be loaded on the computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow chart and/or one or more blocks of the block diagram.

Although the preferred embodiments of the present disclosure have been described, those skilled in the art can make additional changes and modifications on these embodiments once they know the basic creative concept. So the appended claims are intended to be construed to include the preferred embodiments and all changes and modifications that fall into the scope of the present disclosure.

Obviously, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. An image restoration method, comprising:
    inputting an image to be processed into a target denoising network, wherein the target denoising network comprises a single-frame network and a recursive network, and the image to be processed is any frame in a video to be processed;
    removing, via the single-frame network, compression noise of the image to be processed to output a first image;
    removing, according to a content of a previous frame image, compression noise of the image to be processed via the recursive network to output a second image, wherein the previous frame image is one previous frame of the image to be processed in the video to be processed; and
    performing weighted summation on the first image and the second image, and outputting a denoised image for the image to be processed;
    wherein the removing, according to the content of the previous frame image, the compression noise of the image to be processed via the recursive network to output the second image, comprises: removing the compression noise of the image to be processed via at least one first convolution layer, at least one first feature series layer and at least one first sampling layer cascaded in the recursive network, to output the second image;
    wherein the at least one first convolution layer in the recursive network comprises a first sub-convolution layer and a second sub-convolution layer, the at least one first feature series layer comprises a first sub-feature series layer and a second sub-feature series layer, and the at least one first sampling layer comprises first down-sampling layers and first up-sampling layers;
    wherein the removing the compression noise of the image to be processed via the at least one first convolution layer, the at least one first feature series layer and the at least one first sampling layer cascaded in the recursive network, to output the second image comprises:
    receiving, via the first sub-feature series layer, a first feature image of the image to be processed extracted by each of third sub-convolution layers in second convolution layers in the single-frame network;
    obtaining, via the first sub-feature series layer, a second feature image extracted from the previous frame image by the first sub-convolution layer corresponding to each of the third sub-convolution layers in the recursive network;

obtaining a series feature image by performing, via the first sub-feature series layer, series operation on the first feature image and the second feature image;

obtaining a compressed feature image by performing, via each of first sub-convolution layers, compression on the series feature image, wherein the compressed feature images are second feature images extracted from the image to be processed by the first sub-convolution layers;

extracting, via the first down-sampling layers in the at least one first sampling layer, feature images with a plurality of spatial sizes from the compressed feature images;

determining, via the first up-sampling layers, feature images with same spatial sizes as the plurality of spatial sizes;

obtaining a first splicing feature image by splicing, via the second sub-feature series layer, the feature images with the same spatial sizes on feature dimension; and processing, via the second sub-convolution layer, the first splicing feature image, and outputting the second image.

2. The method according to claim 1, wherein the single-frame network comprises at least one second convolution layer, at least one second sampling layer and at least one second feature series layer which are cascaded, the at least one second convolution layer comprises a third sub-convolution layer and a fourth sub-convolution layer, and the at least one second sampling layer comprises second down-sampling layers and second up-sampling layers;

wherein the removing, via the single-frame network, the compression noise of the image to be processed to output the first image, comprises:

extracting, via third sub-convolution layers, first feature images of the image to be processed;

extracting, via the second down-sampling layers, feature images with a plurality of spatial sizes from the first feature images;

determining, via the second up-sampling layers, feature images with the same spatial sizes as the plurality of spatial sizes;

obtaining a second splicing feature image by splicing, via the second feature series layer, the feature images with the same spatial sizes on feature dimension; and processing, via the fourth sub-convolution layer, the second splicing feature image, and outputting the first image.

3. The method according to claim 2, wherein before inputting the image to be processed into the target denoising network, the method further comprises:

a training process of the target denoising network, wherein the training process comprises:

obtaining a plurality of groups of image frame sequences, wherein each group of image frame sequences comprises a plurality of images;

encoding the plurality of groups of image frame sequences into a true value video and a simulation video respectively, wherein each frame of simulation image in the simulation video comprises compression noise;

inputting the each frame of simulation image in the simulation video into a denoising network to be trained; outputting a simulation denoised image of a corresponding frame;

determining, according to a first prediction deviation between the simulation denoised image and a true value image of the corresponding frame in the true value video, a first loss function for the denoising network to be trained; and taking a corresponding network when the first loss function is lower than a first preset threshold as the target denoising network.

4. The method according to claim 1, wherein before inputting the image to be processed into the target denoising network, the method further comprises:

a training process of the target denoising network, wherein the training process comprises:

obtaining a plurality of groups of image frame sequences, wherein each group of image frame sequences comprises a plurality of images;

encoding the plurality of groups of image frame sequences into a true value video and a simulation video respectively, wherein each frame of simulation image in the simulation video comprises compression noise;

inputting the each frame of simulation image in the simulation video into a denoising network to be trained;

outputting a simulation denoised image of a corresponding frame;

determining, according to a first prediction deviation between the simulation denoised image and a true value image of the corresponding frame in the true value video, a first loss function for the denoising network to be trained; and taking a corresponding network when the first loss function is lower than a first preset threshold as the target denoising network.

5. The method according to claim 4, wherein the determining, according to the first prediction deviation between the simulation denoised image and the true value image of the corresponding frame in the true value video, the first loss function for the denoising network to be trained, comprises:

adopting an L2 loss function when the first prediction deviation between the simulation denoised image and the true value image of the corresponding frame in the true value video is smaller than or equal to δ; and adopting an L1 loss function when the first prediction deviation between the simulation denoised image and the true value image of the corresponding frame in the true value video is greater than δ;

wherein a formula corresponding to the L2 loss function is:

$$L_\delta(y, f(x)) = \frac{1}{2}(y - f(x))^2;$$

and a formula corresponding to the L1 loss function is:

$$L_\delta(y, f(x)) = \delta\left(|y - f(x)| - \frac{1}{2}\delta\right)^2;$$

wherein, f(x) represents the simulation denoised image, and y represents the true value image of the frame corresponding to the simulation denoised image in the true value video.

6. The method according to claim 4, wherein after determining, according to the first prediction deviation between the simulation denoised image and the true value image of the corresponding frame in the true value video, the first loss function for the denoising network to be trained, the method further comprises:

performing, when the first loss function is lower than the first preset threshold, sharpening processing on each frame of true value image in the true value video, and obtaining a true value video after edge enhancement;

determining a second prediction deviation between the simulation denoised image and a corresponding frame image in the true value video after edge enhancement, and determining a second loss function for the denoising network to be trained; and taking a corresponding network when the second loss function is lower than a second preset threshold as the target denoising network.

7. A computer-readable storage medium, storing computer instructions, wherein the stored computer instructions, when executed by a processor, implement the image restoration method according to claim 1.

8. An electronic device for image restoration, comprising:
a memory and a processor;
wherein the memory is configured to store a program; and
the processor is configured to execute the program in the memory, comprising:
inputting an image to be processed into a target denoising network, wherein the target denoising network comprises a single-frame network and a recursive network, and the image to be processed is any frame in a video to be processed;
removing, via the single-frame network, compression noise of the image to be processed to output a first image;
removing, according to a content of a previous frame image, compression noise of the image to be processed via the recursive network to output a second image, wherein the previous frame image is one previous frame of the image to be processed in the video to be processed; and
performing weighted summation on the first image and the second image, and outputting a denoised image for the image to be processed;
wherein the processor is configured to execute: removing the compression noise of the image to be processed via at least one first convolution layer, at least one first feature series layer and at least one first sampling layer cascaded in the recursive network, to output the second image;
wherein the at least one first convolution layer in the recursive network comprises a first sub-convolution layer and a second sub-convolution layer, the at least one first feature series layer comprises a first sub-feature series layer and a second sub-feature series layer, and the at least one first sampling layer comprises first down-sampling layers and first up-sampling layers;
wherein the processor is configured to execute:
receiving, via the first sub-feature series layer, a first feature image of the image to be processed extracted by each of third sub-convolution layers in second convolution layers in the single-frame network;
obtaining, via the first sub-feature series layer, a second feature image extracted from the previous frame image by the first sub-convolution layer corresponding to each of the third sub-convolution layers in the recursive network;

obtaining a series feature image by performing, via the first sub-feature series layer, series operation on the first feature image and the second feature image;

obtaining a compressed feature image by performing, via each of first sub-convolution layers, compression on the series feature image, wherein the compressed feature images are second feature images extracted from the image to be processed by the first sub-convolution layers;

extracting, via the first down-sampling layers in the at least one first sampling layer, feature images with a plurality of spatial sizes from the compressed feature images;

determining, via the first up-sampling layers, feature images with same spatial sizes as the plurality of spatial sizes;

obtaining a first splicing feature image by splicing, via the second sub-feature series layer, the feature images with the same spatial sizes on feature dimension; and processing, via the second sub-convolution layer, the first splicing feature image, and outputting the second image.

9. The electronic device according to claim 8, wherein the single-frame network comprises at least one second convolution layer, at least one second sampling layer and at least one second feature series layer which are cascaded, the at least one second convolution layer comprises a third sub-convolution layer and a fourth sub-convolution layer, and the at least one second sampling layer comprises second down-sampling layers and second up-sampling layers;
wherein the processor is configured to execute:
extracting, via third sub-convolution layers, first feature images of the image to be processed;
extracting, via the second down-sampling layers, feature images with a plurality of spatial sizes from the first feature images;
determining, via the second up-sampling layers, feature images with the same spatial sizes as the plurality of spatial sizes;
obtaining a second splicing feature image by splicing, via the second feature series layer, the feature images with the same spatial sizes on feature dimension; and
processing, via the fourth sub-convolution layer, the second splicing feature image, and outputting the first image.

10. The electronic device according to claim 8, wherein the processor is configured to execute: a training process of the target denoising network, wherein the training process comprises:
obtaining a plurality of groups of image frame sequences, wherein each group of image frame sequences comprises a plurality of images;
encoding the plurality of groups of image frame sequences into a true value video and a simulation video respectively, wherein each frame of simulation image in the simulation video comprises compression noise;
inputting the each frame of simulation image in the simulation video into a denoising network to be trained;
outputting a simulation denoised image of a corresponding frame;
determining, according to a first prediction deviation between the simulation denoised image and a true value image of the corresponding frame in the true value video, a first loss function for the denoising network to be trained; and taking a corresponding network when the first loss function is lower than a first preset threshold as the target denoising network.

11. The electronic device according to claim 10, wherein the processor is configured to execute:
adopting an L2 loss function when the first prediction deviation between the simulation denoised image and the true value image of the corresponding frame in the true value video is smaller than or equal to δ; and
adopting an L1 loss function when the first prediction deviation between the simulation denoised image and the true value image of the corresponding frame in the true value video is greater than δ;
wherein a formula corresponding to the L2 loss function is:

$$L_\delta(y, f(x)) = \frac{1}{2}(y - f(x))^2;$$

and
a formula corresponding to the L1 loss function is:

$$L_\delta(y, f(x)) = \delta\left(|y - f(x)| - \frac{1}{2}\delta\right)^2;$$

wherein, f(x) represents the simulation denoised image, and y represents the true value image of the frame corresponding to the simulation denoised image in the true value video.

12. The electronic device according to claim 10, wherein the processor is configured to execute:
performing, when the first loss function is lower than the first preset threshold, sharpening processing on each frame of true value image in the true value video, and obtaining a true value video after edge enhancement;
determining a second prediction deviation between the simulation denoised image and a corresponding frame image in the true value video after edge enhancement, and determining a second loss function for the denoising network to be trained; and
taking a corresponding network when the second loss function is lower than a second preset threshold as the target denoising network.

* * * * *